US010087345B2

(12) United States Patent
Yoshida et al.

(10) Patent No.: US 10,087,345 B2
(45) Date of Patent: Oct. 2, 2018

(54) PRESSURE-SENSITIVE ADHESIVE COMPOSITION, PRESSURE-SENSITIVE ADHESIVE LAYER, PRESSURE-SENSITIVE ADHESIVE TAPE, AND DOUBLE-COATED PRESSURE-SENSITIVE ADHESIVE TAPE

(71) Applicant: NITTO DENKO CORPORATION, Ibaraki-shi, Osaka (JP)

(72) Inventors: Akiko Yoshida, Ibaraki (JP); Shigeki Ishiguro, Ibaraki (JP); Satomi Yoshie, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/103,574

(22) PCT Filed: Dec. 17, 2014

(86) PCT No.: PCT/JP2014/083402
§ 371 (c)(1),
(2) Date: Jun. 10, 2016

(87) PCT Pub. No.: WO2015/093526
PCT Pub. Date: Jun. 25, 2015

(65) Prior Publication Data
US 2016/0312073 A1  Oct. 27, 2016

(30) Foreign Application Priority Data

Dec. 20, 2013 (JP) ................................ 2013-263918
Dec. 8, 2014 (JP) ................................ 2014-247970

(51) Int. Cl.
C09J 7/38 (2018.01)
C09J 11/08 (2006.01)
(Continued)

(52) U.S. Cl.
CPC ................. *C09J 7/38* (2018.01); *B32B 5/022* (2013.01); *B32B 7/06* (2013.01); *B32B 7/12* (2013.01);
(Continued)

(58) Field of Classification Search
None
See application file for complete search history.

(56) References Cited

U.S. PATENT DOCUMENTS 5,008,329 A * 4/1991 Abe ..................... C08F 220/18
524/736
5,780,151 A * 7/1998 Miller ................ C08G 63/6888
427/207.1

(Continued)

FOREIGN PATENT DOCUMENTS

JP H09-263749 10/1997
JP 2001-049223 2/2001
(Continued)

OTHER PUBLICATIONS

Machine translation of JP 2001049223 A (2001).*
(Continued)

*Primary Examiner* — Frank D Ducheneaux
(74) *Attorney, Agent, or Firm* — Knobbe Martens Olson & Bear, LLP

(57) ABSTRACT

A polyester-based pressure-sensitive adhesive layer, pressure-sensitive adhesive tape, and double-coated pressure-sensitive adhesive tape each having high durability (high heating humidification storage stability) and good adhesive properties are provided using a polyester-based pressure-sensitive adhesive composition. The polyester-based pressure-sensitive adhesive composition of the invention includes a polyester, a hydrolysis-resistant agent, a tackifier with an acid value of 8 or less and a softening point of 80

(Continued)

to 170° C., and a crosslinking agent, and contains 20 to 100 parts by weight of the tackifier based on 100 parts by weight of the polyester.

9 Claims, 1 Drawing Sheet

(51) Int. Cl.
| | |
|---|---|
| C09J 167/00 | (2006.01) |
| C09J 167/08 | (2006.01) |
| C09J 193/00 | (2006.01) |
| C09J 193/04 | (2006.01) |
| C09J 167/02 | (2006.01) |
| C08L 61/18 | (2006.01) |
| C08L 67/00 | (2006.01) |
| C08L 67/08 | (2006.01) |
| C08K 5/29 | (2006.01) |
| C08K 5/01 | (2006.01) |
| B32B 7/06 | (2006.01) |
| B32B 27/36 | (2006.01) |
| B32B 5/02 | (2006.01) |
| B32B 7/12 | (2006.01) |
| B32B 15/08 | (2006.01) |
| B32B 27/06 | (2006.01) |
| B32B 27/08 | (2006.01) |
| B32B 27/10 | (2006.01) |
| B32B 27/12 | (2006.01) |
| B32B 27/18 | (2006.01) |
| B32B 29/00 | (2006.01) |
| C08L 93/00 | (2006.01) |

(52) U.S. Cl.
CPC ............ *B32B 15/08* (2013.01); *B32B 27/065* (2013.01); *B32B 27/08* (2013.01); *B32B 27/10* (2013.01); *B32B 27/12* (2013.01); *B32B 27/18* (2013.01); *B32B 27/36* (2013.01); *B32B 27/365* (2013.01); *B32B 29/002* (2013.01); *C08K 5/01* (2013.01); *C08K 5/29* (2013.01); *C08L 61/18* (2013.01); *C08L 67/00* (2013.01); *C08L 67/08* (2013.01); *C08L 93/00* (2013.01); *C09J 11/08* (2013.01); *C09J 167/00* (2013.01); *C09J 167/02* (2013.01); *C09J 167/08* (2013.01); *C09J 193/00* (2013.01); *C09J 193/04* (2013.01); *B32B 2307/748* (2013.01); *B32B 2405/00* (2013.01); *C09J 2201/128* (2013.01); *C09J 2201/606* (2013.01); *C09J 2201/622* (2013.01); *C09J 2205/102* (2013.01); *C09J 2467/00* (2013.01); *C09J 2467/005* (2013.01); *C09J 2469/006* (2013.01); *C09J 2493/00* (2013.01)

(56) References Cited

U.S. PATENT DOCUMENTS

| | | |
|---|---|---|
| 6,218,006 B1 | 4/2001 | Tokunaga et al. |
| 6,254,954 B1 | 7/2001 | Bennett et al. |
| 2002/0065346 A1 | 5/2002 | Murschall et al. |
| 2012/0232226 A1* | 9/2012 | Takahira ................ C09J 167/08 525/451 |
| 2013/0029141 A1* | 1/2013 | Tanaka ................... C09J 7/0264 428/337 |
| 2015/0050493 A1 | 2/2015 | Yoshie et al. |

FOREIGN PATENT DOCUMENTS

| | | | |
|---|---|---|---|
| JP | 2001/207131 A * | 7/2001 | ............... C09F 1/04 |
| JP | 2002-187965 | 7/2002 | |
| JP | 2007-297445 | 11/2007 | |
| JP | 2011-150214 | 8/2011 | |
| JP | 2011-222580 | 11/2011 | |
| JP | 2013-216874 | 10/2013 | |
| WO | WO 2011/055827 A1 * | 2/2011 | ............ C09J 167/00 |

OTHER PUBLICATIONS

Machine translation of JP 2001207131 A (2001).*
International Preliminary Report of Patentability, dated Jun. 30, 2016, in corresponding International Application No. PCT/JP2014/083402, including translation of the Written Opinion of the International Searching Authority.

* cited by examiner

[Fig.1]
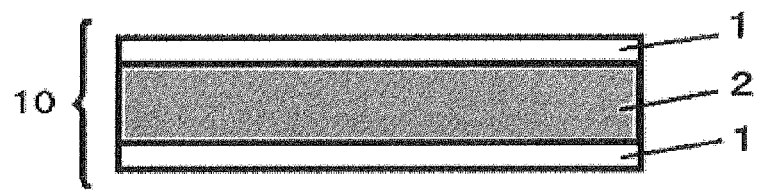
[Fig.2]
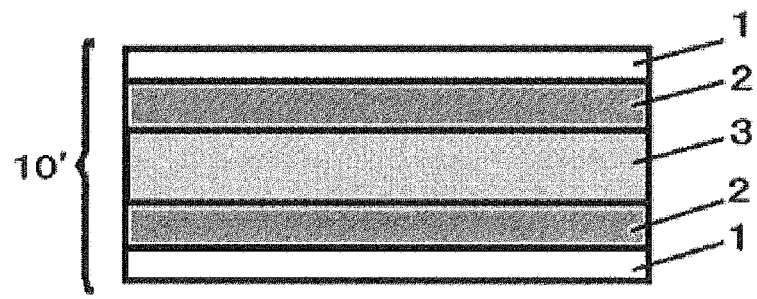
[Fig.3]
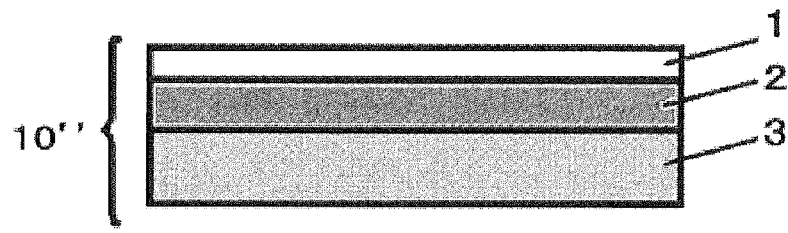

PRESSURE-SENSITIVE ADHESIVE COMPOSITION, PRESSURE-SENSITIVE ADHESIVE LAYER, PRESSURE-SENSITIVE ADHESIVE TAPE, AND DOUBLE-COATED PRESSURE-SENSITIVE ADHESIVE TAPE

TECHNICAL FIELD

The invention relates to a polyester-based pressure-sensitive adhesive composition, a polyester-based pressure-sensitive adhesive layer, a polyester-based pressure-sensitive adhesive tape, and a polyester-based double-coated pressure-sensitive adhesive tape.

BACKGROUND ART

Polyester resins have been conventionally used for a wide variety of applications such as films, PET bottles, fibers, toners, electric parts, adhesives, and pressure-sensitive adhesives because of their high heat resistance, chemical resistance, durability, and mechanical strength.

In general, polyester resins have vulnerability to hydrolysis. Therefore, for example, Patent Documents 1 and 2 describe a study conducted to develop polyester films with high durability (resistance to moisture) by adding a hydrolysis-resistant agent to improve the hydrolysis resistance of polyester resins.

On the other hand, at present, polyester resin-based adhesives do not simultaneously have high durability and good adhesive properties, although improvements have been made for good adhesive properties (adhesive strength) or high durability.

PRIOR ART DOCUMENTS

Patent Documents

Patent Document 1: JP-A-2011-222580
Patent Document 2: JP-A-2002-187965

SUMMARY OF THE INVENTION

Problems to be Solved by the Invention

In view of these circumstances, it is therefore an object of the invention to provide a polyester-based pressure-sensitive adhesive composition that can simultaneously provide high durability (heating humidification storage stability) and good adhesive properties, to provide a polyester-based pressure-sensitive adhesive layer produced therewith, and to provide a pressure-sensitive adhesive tape or a double-coated pressure-sensitive adhesive tape produced with the pressure-sensitive adhesive layer.

Means for Solving the Problems

As a result of intensive studies to solve the problems, the inventors have found the polyester-based pressure-sensitive adhesive composition described below and thus completed the invention.

Specifically, the invention is directed to a polyester-based pressure-sensitive adhesive composition including a polyester, a hydrolysis-resistant agent, a tackifier, and a cross-linking agent, wherein the tackifier has an acid value of 8 or less and a softening point of 80 to 170° C. The polyester-based pressure-sensitive adhesive composition of the invention contains 20 to 100 parts by weight of the tackifier based on 100 parts by weight of the polyester.

In the polyester-based pressure-sensitive adhesive composition of the invention, the hydrolysis-resistant agent is preferably a carbodiimide group-containing compound. The polyester-based pressure-sensitive adhesive composition of the invention preferably contains 0.05 to 5 parts by weight of the carbodiimide group-containing compound based on 100 parts by weight of the polyester.

In the polyester-based pressure-sensitive adhesive composition of the invention, the polyester is preferably a product obtained by polycondensation of a dicarboxylic acid component and a diol component.

In the polyester-based pressure-sensitive adhesive composition of the invention, the tackifier preferably includes at least one terpene resin.

The invention is also directed to a polyester-based pressure-sensitive adhesive layer including a product made from the polyester-based pressure-sensitive adhesive composition. The polyester-based pressure-sensitive adhesive layer of the invention preferably has an adhesive strength of 7 N/20 mm or more to a polycarbonate plate.

The polyester-based pressure-sensitive adhesive layer of the invention preferably has a holding power of 0.8 mm/60 minutes or less at 40° C.

The polyester-based pressure-sensitive adhesive layer of the invention is preferably provided with a release liner on at least one side of the layer.

The invention is also preferably directed to a polyester-based pressure-sensitive adhesive tape including the polyester-based pressure-sensitive adhesive layer and a support provided on at least one side of the layer.

The invention is also preferably directed to a polyester-based double-coated pressure-sensitive adhesive tape including: at least two polyester-based pressure-sensitive adhesive layers; and a support provided on at least one side of the polyester-based pressure-sensitive adhesive layer.

Effect of the Invention

The polyester-based pressure-sensitive adhesive layer, pressure-sensitive adhesive tape, and double-coated pressure-sensitive adhesive tape obtained with the polyester-based pressure-sensitive adhesive composition of the invention have high durability (high heating humidification storage stability) and good adhesive properties and thus are useful.

BRIEF DESCRIPTION OF THE DRAWINGS

FIG. 1 is a schematic diagram of a double-coated pressure-sensitive adhesive tape including a pressure-sensitive adhesive layer and release liners attached to both surfaces of the pressure-sensitive adhesive layer;

FIG. 2 is a schematic diagram of a double-coated pressure-sensitive adhesive tape including a support, pressure-sensitive adhesive layers provided on both surfaces of the support, and release liners attached on the surfaces of the pressure-sensitive adhesive layers; and FIG. 3 is a schematic diagram of a pressure-sensitive adhesive tape including a pressure-sensitive adhesive layer, a release liner attached to one surface of the pressure-sensitive adhesive layer, and a support provided on the other surface of the pressure-sensitive adhesive layer.

MODE FOR CARRYING OUT THE INVENTION

Hereinafter, embodiments of the present invention will be described in detail.

The polyester-based pressure-sensitive adhesive composition of the invention (hereinafter also simply referred to as the pressure-sensitive adhesive composition) includes a polyester, a hydrolysis-resistant agent, a tackifier, and a crosslinking agent, in which the tackifier has an acid value of 8 or less and a softening point of 80 to 170° C. and which contains 20 to 100 parts by weight of the tackifier based on 100 parts by weight of the polyester. In addition to the polyester, the composition contains the hydrolysis-resistant agent and a specific amount of the tackifier with a specific acid value and a specific softening point. These features make it possible to obtain a pressure-sensitive adhesive layer (pressure-sensitive adhesive tape) having both high durability (high heating humidification storage stability) and good adhesive properties (good adhering and cohesive strength) and thus are useful. In general, the polyester-based pressure-sensitive adhesive has a high level of electrical insulating properties, mechanical strength, bending fatigue strength, water and chemical resistance, and optical transparency and also hardly expands or contracts. In particular, the polyester-based pressure-sensitive adhesive can be applied both thickly and thinly. Therefore, the polyester-based pressure-sensitive adhesive is useful for a variety of applications.

The pressure-sensitive adhesive tape or the double-coated pressure-sensitive adhesive tape according to the invention may be of any type as long as it has the pressure-sensitive adhesive layer made from the pressure-sensitive adhesive composition. FIG. 1 shows an example of the pressure-sensitive adhesive tape or the double-coated pressure-sensitive adhesive tape, which includes a pressure-sensitive adhesive layer and release liners attached to both surfaces of the pressure-sensitive adhesive layer (with no support). FIG. 2 shows another example of the tape, which includes a support, pressure-sensitive adhesive layers provided on both surfaces of the support, and release liners each attached to the surface of each pressure-sensitive adhesive layer (with a support). FIG. 3 shows a further example of the tape, which includes a pressure-sensitive adhesive layer, a support provided on one surface of the pressure-sensitive adhesive layer, and a release liner attached to the other surface of the pressure-sensitive adhesive layer. The pressure-sensitive adhesive layer may be a stack (laminate) of two or more pressure-sensitive adhesive sub-layers bonded together and made of the same or different materials. The double-coated pressure-sensitive adhesive tape may include two or more support layers and three or more pressure-sensitive adhesive layers. The polyester-based pressure-sensitive adhesive tape and the polyester-based double-coated pressure-sensitive adhesive tape may also be simply referred to as the pressure-sensitive adhesive tape and the double-coated pressure-sensitive adhesive tape, respectively, and the pressure-sensitive adhesive tape and the double-coated pressure-sensitive adhesive tape may also be generically referred to as the pressure-sensitive adhesive tape.

<Polyester>

The polyester used in the invention is preferably one obtained by polycondensation of at least a dicarboxylic acid component and a diol component. Any known polymerization method may be used as the method for synthesizing the polyester.

It is a preferable embodiment that the polyester is produced from plant-derived raw materials. The reason for this is that a plant-derived raw material is biodegradable, is said to be so-called carbon neutral, is friendly to global environments, and is suitable for obtaining an environment-friendly pressure-sensitive adhesive.

The polyester includes at least a dicarboxylic acid component. The dicarboxylic acid component is preferably derived from a molecule having two carboxyl groups. The dicarboxylic acid component is more preferably derived from a material including a plant-derived raw material as a main component. The term "a material including a plant-derived raw material as a main component" means that what is called the biomass ratio is high, and the term "main component" means that the plant-derived raw material makes up the largest part of all the raw materials used to form the polyester.

In the invention, the biomass ratio is the ratio of the weight of the plant-derived raw material used in the production of the pressure-sensitive adhesive layer to the total weight of the pressure-sensitive adhesive layer. The biomass ratio is calculated from the following formula:

The biomass ratio (% by weight) of the pressure-sensitive adhesive layer=100×[the weight (g) of the plant-derived raw material]/[the total weight (g) of the pressure-sensitive adhesive layer]

The biomass ratio is preferably 50% by weight or more, more preferably 60% by weight or more, even more preferably 70% by weight or more. The pressure-sensitive adhesive obtained with a high biomass ratio of 50% by weight or more is environmentally compatible or friendly to the global environment, which is a preferred mode.

Specific examples of the dicarboxylic acid include, but are not limited to, plant-derived dicarboxylic acids such as dimer acids derived from a castor oil-derived sebacic acid, oleic acid and erucic acid. Examples of other dicarboxylic acids include aliphatic and alicyclic dicarboxylic acids such as adipic acid, azelaic acid, 1,4-cyclohexanedicarboxylic acid, 4-methyl-1,2-cyclohexanedicarboxylic acid, dodecenyl succinic anhydride, fumaric acid, succinic acid, dodecanedioic acid, hexahydrophthalic anhydride, tetrahydrophthalic anhydride, maleic acid, maleic anhydride, itaconic acid, and citraconic acid; as well as terephthalic acid, isophthalic acid, orthophthalic acid, 1,5-naphthalenedicarboxylic acid, 2,6-naphthalenedicarboxylic acid, 4,4'-diphenyldicarboxylic acid, 2,2'-diphenyldicarboxylic acid, and 4,4'-diphenyl ether dicarboxylic acid. Among them, dimer acids and the like are preferable in terms of plant-derived acids and friendliness to global environments. These acids may be used alone or in combination of two or more of them.

In addition to the dicarboxylic acid, a tricarboxylic or polycarboxylic acid containing three or more carboxyl groups may also be used. However, when a polyfunctional carboxylic acid such as a tricarboxylic acid is used, a network structure (three-dimensional crosslinked structure) can be formed so that the adhesive strength (adhesive force) of the pressure-sensitive adhesive layer (pressure-sensitive adhesive tape) can be kept low. Therefore, when high adhesion is necessary, the tricarboxylic or polycarboxylic acid should preferably not be used.

The polyester also includes a diol component. The diol component preferably includes a component derived from a compound having at least two hydroxyl groups per molecule. The diol component is more preferably derived from a material including a plant-derived raw material as a main component.

Examples of the diol component include, but are not limited to, plant-derived diols such as fatty acid esters derived from castor oil, dimer diols derived from oleic acid, erucic acid, or the like, and glycerol monostearate; and other diols including aliphatic glycols such as ethylene glycol, 1,2-propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentyl glycol, diethylene glycol, dipropylene glycol, 2,2,4-trimethyl-1,5-pentanediol, 2-ethyl-2-butylpropanediol, 1,9-nonanediol, 2-methyloctanediol, 1,10-decanediol, 1,4-cyclohexanedimethanol, and 1,2-cyclohexanedimethanol; and diols other than the aliphatic glycols, such as ethylene oxide adducts of bisphenol A, propylene oxide adducts of bisphenol A, ethylene oxide adducts of hydrogenated bisphenol A, propylene oxide adducts of hydrogenated bisphenol A, polytetramethylene glycol, polypropylene glycol, polyethylene glycol, and polycarbonate glycol. In particular, plant-derived aliphatic diols are preferred because they are global environment-friendly. These diols may be used alone or in combination of two or more.

The molar ratio of the carboxylic acid component to the diol component is preferably 1:1.04 to 2.10, more preferably 1:1.06 to 1.70, even more preferably 1:1.07 to 1.30. If the molar ratio is lower than 1:1.04, the resulting polyester can have a higher molecular weight and a smaller number of hydroxyl groups as functional groups, so that the crosslinking reaction of the polyester can be difficult to speedup even when a crosslinking agent (such as a polyfunctional isocyanate) is used. As a result, it will be difficult to obtain a pressure-sensitive adhesive layer having the desired gel fraction mentioned below, and the pressure-sensitive adhesive (layer) may fail to have a sufficient holding power (cohesive strength). On the other hand, if the molar ratio is more than 1:2.10, only a polyester with a molecular weight smaller than the desired value will tend to form. That is not preferred because gelation of such a polyester cannot be facilitated even when a crosslinking agent is used, so that it will be difficult to obtain a pressure-sensitive adhesive layer having a desired gel fraction.

The polyester used in the invention preferably has a weight average molecular weight (Mw) of 5,000 to 60,000, more preferably 8,000 to 50,000, even more preferably 15,000 to 45,000. A weight average molecular weight of less than 5,000 may cause a reduction in the adhesive strength (adhesive force) or holding power (cohesive strength) of the pressure-sensitive adhesive including the polyester. If the weight average molecular weight is more than 60,000, the content of hydroxyl groups as functional groups will be relatively low, so that the crosslinking reaction of the polyester can be difficult to speed up even when a crosslinking agent (such as a polyfunctional isocyanate) is used, which can make it difficult to obtain a pressure-sensitive adhesive layer with the desired gel fraction mentioned below, and therefore is not preferred.

Other components other than the dicarboxylic acid and the aliphatic diol can be polymerized or added after polymerization to an extent that the properties of the polyester to be used for the pressure-sensitive adhesive sheet of the present invention are not adversely affected.

In the present invention, the polymerization (condensation polymerization) reaction of the dicarboxylic acid component and the diol component may be carried out using a solvent or using no solvent under reduced pressure, and a conventionally known method may be used.

Examples of a method of removing water produced by the polymerization (condensation) reaction include a method in which azeotropic dehydration is conducted using toluene or xylene, a method in which an inert gas is bubbled into a reaction system thereby ejecting produced water and monoalcohol out of the reaction system, together with the inert gas, and a method of distilling under reduced pressure.

It is possible to use, as a polymerization catalyst used in the polymerization (condensation) reaction, those used as a polymerization catalyst used in a conventional polyester, and examples of usable polymerization catalyst include, but are not limited to, various metal compounds such as titanium-based, tin-based, antimony-based, zinc-based and germanium-based compounds; and strong acid compounds such as p-toluenesulfonic acid and sulfuric acid.

<Crosslinking Agent>

The pressure-sensitive adhesive composition of the invention contains a crosslinking agent together with the polyester. The pressure-sensitive adhesive composition containing the crosslinking agent can undergo a crosslinking reaction in the process of forming a pressure-sensitive adhesive layer. The crosslinking agent may be any conventionally known crosslinking agent such as a polyvalent isocyanurate, a polyfunctional isocyanate compound, a polyfunctional melamine compound, a polyfunctional epoxy compound, a polyfunctional oxazoline compound, a polyfunctional aziridine compound, or a metal chelate compound. Particularly in view of versatility, a polyvalent isocyanurate or a polyfunctional isocyanate compound is preferably used. These crosslinking agents may be used alone or in combination of two or more.

The polyvalent isocyanurate may be, for example, a polyisocyanurate of hexamethylene diisocyanate. The polyvalent isocyanurate can be effectively used for the purpose of obtaining a pressure-sensitive adhesive layer with high transparency or the desired gel fraction mentioned below. It is also possible to use commercially available products of the polyvalent isocyanurate and specific examples thereof include "DURANATE TPA-100" (trade name, manufactured by Asahi Kasei Chemicals Corporation), and "CORONATE HK", "CORONATE HX" and "CORONATE 2096" (trade names, manufactured by Nippon Polyurethane Industry Co., Ltd.).

As the polyfunctional isocyanate compound, a compound having at least two isocyanate groups in the molecule is preferably used, and a compound having three or more isocyanate groups in the molecule is more preferably used without any particular limitation. Specific examples may include aliphatic polyisocyanates, alicyclic polyisocyanates, and aromatic polyisocyanates.

Examples of the aliphatic polyisocyanates include tetramethylene diisocyanates such as 1,2-ethylene diisocyanate, 1,2-tetramethylene diisocyanate, 1,3-tetramethylene diisocyanate and 1,4-tetramethylene diisocyanate; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate and 2,5-hexamethylene diisocyanate; and 2-methyl-1,5-pentane diisocyanate, 3-methyl-1,5-pentane diisocyanate and lysin diisocyanate.

Examples of the alicyclic polyisocyanates include isophorone diisocyanate; cyclohexyl diisocyanates such as 1,2-cyclohexyl diisocyanate, 1,3-cyclohexyl diisocyanate and 1,4-cyclohexyl diisocyanate; cyclopentyl diisocyanates such as 1,2-cyclopentyl diisocyanate and 1,3-cyclopentyl diisocyanate; hydrogenated xylylene diisocyanate, hydrogenated tolylene diisocyanate, hydrogenated diphenylmethane diisocyanate, hydrogenated tetramethylxylene diisocyanate and 4,4'-dicyclohexylmethane diisocyanate.

Examples of the aromatic polyisocyanates include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenyletherdiisocyanate, 2-nitrodiphenyl-4,4'- diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate and xylylene-1,3-diisocyanate.

It is possible to use, as the polyfunctional isocyanate compound, for example, dimers and trimers of araliphatic polyisocyanates other than the aliphatic polyisocyanates, alicyclic polyisocyanates, aromatic polyisocyanates and araliphatic polyisocyanates. Specific examples thereof include a dimmer and a trimer of diphenylmethane diisocyanate; a reaction product of trimethylolpropane and tolylene diisocyanate; a reaction product of trimethylolpropane and hexamethylene diisocyanate; and polymers such as polymethylene polyphenylisocyanate, polyether polyisocyanate and polyester polyisocyanate.

It is also possible to use commercially available products as the polyfunctional isocyanate compound, and specific examples thereof include "CORONATE L" (trade name, manufactured by Nippon Polyurethane Industry Co., Ltd.) as a trimer adduct of trimethylolpropane and tolylene diisocyanate, and "CORONATE HL" (trade name, manufactured by Nippon Polyurethane Industry Co., Ltd.) as a trimer adduct of trimethylolpropane and hexamethylene diisocyanate.

Examples of the polyfunctional melamine compound include methylated methylolmelamine and butylated hexamethylolmelamine, and examples of the polyfunctional epoxy compound include diglycidylaniline and glycerin diglycidyl ether.

Although not limited, the type and content of the crosslinking agent are preferably such that the resulting pressure-sensitive adhesive layer has a gel fraction of 20 to 70% by weight, more preferably 25 to 60% by weight, even more preferably 35 to 55% by weight. The pressure-sensitive adhesive layer with a gel fraction of less than 20% by weight may fail to have sufficient holding power (cohesiveness). The pressure-sensitive adhesive layer with a gel fraction of more than 70% by weight may have a high crosslink density and thus may fail to have high adhesive strength (adhesive force), which is not preferred.

The amount of the crosslinking agent is preferably from 0.5 to 30 parts by weight, more preferably from 1 to 15 parts by weight, based on 100 parts by weight of the polyester. If the amount of the crosslinking agent is less than 0.5 parts by weight, it may be impossible to improve the holding power (cohesive strength) of the pressure-sensitive adhesive layer, or the heat resistance may decrease. If the amount of the crosslinking agent is more than 30 parts by weight, the crosslinking reaction may proceed excessively to reduce the adhesive strength, which is not preferred.

In order to efficiently adjust the gel fraction in the pressure-sensitive adhesive layer to be used for the pressure-sensitive adhesive sheet of the present invention, a crosslinking catalyst may be properly used. Examples of the catalyst include tetra-n-butyl titanate, tetraisopropyl titanate, butyltin oxide, and dioctyltin dilaurate. These catalysts may be used alone or in combination of two or more of them.

The blending amount of the catalyst is not particularly limited, but is preferably 0.01 to 1 part by weight and more preferably 0.05 to 0.5 parts by weight based on 100 parts by weight of the polyester. If the blending amount is less than 0.01 parts by weight, the effect of catalyst addition may not be obtained, and if the blending amount exceeds 1 part by weight, the shelf life is considerably shortened and the stability for application may be lowered, and therefore it is not preferable.

In order to prolong the shelf life, acetyl acetone, methanol, methyl orthoacetate, and the like may be also blended properly as a retarder.

<Tackifier>

The pressure-sensitive adhesive composition of the invention also contains a tackifier together with the polyester. The composition containing the tackifier can form a pressure-sensitive adhesive layer with desired properties, which is particularly expected to have not only improved adhesive properties but also improved durability (improved heating humidification storage stability or improved resistance to degradation of durability).

The tackifier is not limited as long as it has an acid value of 8 or less and a softening point of 80 to 170° C. The tackifier may be a conventionally known tackifier. The tackifier may be, for example, a terpene resin, a phenolic resin, a rosin resin, an aliphatic petroleum resin, an aromatic petroleum resin, a copolymer-type petroleum resin, an alicyclic petroleum resin, a xylene resin, an epoxy resin, a polyamide resin, a ketone resin, or an elastomer resin. In particular, the tackifier preferably includes at least one terpene resin. The terpene resin preferably makes up 30% by weight or more, more preferably 40% by weight or more, even more preferably 50% by weight or more, further more preferably 60% by weight or more of the total weight (100% by weight) of the tackifier. These tackifiers may be used alone or in combination of two or more.

Examples of the terpene-based tackifiers include terpene resins, terpene-phenol resins, and aromatic modified terpene resins, and specific examples of the terpene-based tackifiers that can be used include an α-pinene polymer, a β-pinene polymer, and a dipentene polymer, and terpene resins obtained by phenol modification, aromatic modification, hydrogenation modification, and hydrocarbon modification of the above polymers. Examples of commercially available products thereof include products manufactured by YASU-HARA CHEMICAL CO., LTD., such as YS POLYSTER 5145, YS RESIN PX1250, YS POLYSTER T145, YS RESIN TO115, YS POLYSTER U130, and CLEARON P125.

Specifically, it is possible to use, as the phenol-based tackifier, condensates of various phenols such as phenol, m-cresol, 3,5-xylenol, p-alkylphenol and resorcin, and formaldehyde can be used. It is also possible to use resol obtained by an addition reaction of the phenols and formaldehyde in the presence of an alkali catalyst, novolak obtained by a condensation reaction of the phenols and formaldehyde in the presence of an acid catalyst, and a rosin-modified phenol resin obtained by adding phenol to rosins such as an unmodified or modified rosin, or a derivatives thereof in the presence of an acid catalyst, followed by thermopolymerization.

Examples of the rosin-based tackifiers include rosin resins, polymerized rosin resins, hydrogenated rosin resins, rosin ester resins, hydrogenated rosin ester resins, and rosin phenol resins, and specific examples of the rosin-based tackifiers that can be used include unmodified rosins (raw rosins) such as gum rosin, wood rosin, and tall oil rosin; and modified rosins obtained by subjecting these unmodified rosins to hydrogenation, disproportionation, polymerization, and other chemical modification.

The tackifier has an acid value of 8 or less, preferably 6 or less, more preferably 2 or less. When the acid value falls within these ranges, the degradation of the durability (heating humidification storage stability) of the pressure-sensitive adhesive layer can be suppressed, which is preferred. It will be understood that two or more tackifiers may also be used without any particular problem as long as their total average acid value is 8 or less.

The tackifier has a softening point of 80 to 170° C., preferably 90 to 160° C., more preferably 100 to 150° C. (for example, as measured by ring and ball method). When the softening point falls within these ranges, the adhesive properties (adhesive strength and cohesive strength) can be improved, which is preferred.

The amount of the tackifier is 20 to 100 parts by weight, preferably 30 to 80 parts by weight, more preferably 35 to 80 parts by weight, based on 100 parts by weight of the polyester. When the amount of the tackifier falls within these ranges, the adhesive properties (adhesive strength and cohesive strength) can be improved, which is preferred.

<Hydrolysis-Resistant Agent>

The pressure-sensitive adhesive composition of the invention contains a hydrolysis-resistant agent together with the polyester. The composition containing the hydrolysis-resistant agent can form a pressure-sensitive adhesive layer with desired properties, which is particularly expected to have improved durability (improved heating humidification storage stability).

The hydrolysis-resistant agent is not limited and may be a conventionally known agent. The hydrolysis-resistant agent may be, for example, a compound capable of being bonded to the polyester by reacting with the terminal carboxylic acid groups of the polyester. Specifically, the hydrolysis-resistant agent may be a compound having an oxazoline group, an epoxy group, a carbodiimide group, or other functional groups. In particular, a carbodiimide group-containing compound is preferable in that it is highly effective in quenching the catalytic activity of protons derived from the carboxyl end groups.

Examples of the carbodiimide group-containing compound include dicyclohexylcarbodiimide, diisopropylcarbodiimide, dimethylcarbodiimide, diisobutylcarbodiimide, dioctylcarbodiimide, tert-butylisopropylcarbodiimide, diphenylcarbodiimide, di-tert-butylcarbodiimide, di-β-naphthylcarbodiimide, and a cyclic structure-containing monofunctional carbodiimide. As used herein, the term "cyclic structure-containing monofunctional carbodiimide" refers to a compound having one carbodiimide group in the molecular structure and also having a linking group including an aliphatic group, an alicyclic group, an aromatic group, or any combination therewith, in which the first and second nitrogen atoms of the carbodiimide group are bonded through the linking group. The linking group may contain a heteroatom or a substituent. Particularly preferred are dicyclohexylcarbodiimide, diisopropylcarbodiimide, and a cyclic structure-containing monofunctional carbodiimide. Alternatively, a carbodiimide with a degree of polymerization of 3 to 15 may also be used, examples of which include 1,5-naphthalenecarbodiimide, 4,4'-diphenylmethanecarbodiimide, 4,4'-diphenyldimethylmethanecarbodiimide, 1,3-phenylenecarbodiimide, 1,4-phenylene diisocyanate, 2,4-tolylenecarbodiimide, 2,6-tolylenecarbodiimide, a mixture of 2,4-tolylenecarbodiimide and 2,6-tolylenecarbodiimide, hexamethylenecarbodiimide, cyclohexane-1,4-carbodiimide, xylylenecarbodiimide, isophoronecarbodiimide, isophoronecarbodiimide, dicyclohexylmethane-4,4'-carbodiimide, methylcyclohexanecarbodiimide, tetramethylxylylenecarbodiimide, 2,6-diisopropylphenylcarbodiimide, 1,3,5-triisopropylbenzene-2,4-carbodiimide, and a cyclic structure-containing polyfunctional carbodiimide. As used herein, the term "cyclic structure-containing polyfunctional carbodiimide" refers to a compound having two or more carbodiimide groups in the molecular structure and also having a linking group including an aliphatic group, an alicyclic group, an aromatic group, or any combination thereof, in which nitrogen atoms belonging to different carbodiimide groups are bonded through the linking group.

The carbodiimide group-containing compound should preferably be a highly heat-resistant, carbodiimide group-containing compound, because otherwise it can be thermally decomposed to produce an isocyanate gas. Techniques that are preferably used to increase the heat resistance include increasing the molecular weight (degree of polymerization) of the carbodiimide group-containing compound, allowing the end of the carbodiimide group-containing compound to have a highly heat-resistant structure, and allowing the carbodiimide group-containing compound to have a cyclic structure. It should be noted that if the high-molecular-weight, carbodiimide group-containing compound used has too high a molecular weight, the molecular chain of the carbodiimide group-containing compound can be fragmented (cleaved) by heat or shear applied in a melting and kneading process, so that the formability or heat resistance of the polyester film may decrease. In addition, once the carbodiimide group-containing compound undergoes thermal decomposition, it can easily undergo additional thermal decomposition. Therefore, the temperature at which the polyester is extruded should preferably be as low as possible, so that the thermal decomposition of the carbodiimide group-containing compound can be suppressed. If the carbodiimide group-containing compound has a linear structure, it can react with the terminal carboxylic acid group to produce an isocyanate gas. If the carbodiimide group-containing compound has a cyclic structure with two or more carbodiimide groups in the molecular structure, it can also react with the terminal carboxylic acid group to produce an isocyanate gas. In order to suppress the production of an isocyanate gas, therefore, the carbodiimide group-containing compound should preferably be a cyclic structure-containing, monofunctional, carbodiimide group-containing compound having one carbodiimide group in the molecular structure.

The epoxy compound is preferably, for example, a glycidyl ester compound or a glycidyl ether compound. Examples of the glycidyl ester compound include glycidyl benzoate, glycidyl-tert-butyl benzoate, glycidyl p-toluate, glycidyl cyclohexanecarboxylate, glycidyl pelargonate, glycidyl stearate, glycidyl laurate, glycidyl palmitate, glycidyl behenate, glycidyl versatate, glycidyl oleate, glycidyl linoleate, glycidyl linolenate, glycidyl behenolate, glycidyl stearolate, diglycidyl terephthalate, diglycidyl isophthalate, diglycidyl phthalate, diglycidyl naphthalenedicarboxylate, diglycidyl methylterephthalate, diglycidyl hexahydrophthalate, diglycidyl tetrahydrophthalate, diglycidyl cyclohexanedicarboxylate, diglycidyl adipate, diglycidyl succinate, diglycidyl sebacate, diglycidyl dodecanedioate, diglycidyl octadecanedicarboxylate, triglycidyl trimellitate, and tetraglycidyl pyromellitate, one or more of which may be used. Examples of the glycidyl ether compound include phenyl glycidyl ether, o-phenyl glycidyl ether, 1,4-bis(β,γ-epoxypropoxy)butane, 1,6-bis(β,γ-epoxypropoxy)hexane, 1,4-bis(β,γ-epoxypropoxy)benzene, 1-(β,γ-epoxypropoxy)-2-ethoxyethane, 1-(β,γ-epoxypropoxy)-2-benzyloxyethane, 2,2-bis-[p-(β,γ-epoxypropoxy)phenyl]propane, and a bis-glycidyl polyether obtainable by the reaction of a bisphenol, such as 2,2-bis(4-hydroxyphenyl)propane or 2,2-bis(4-hydroxyphenyl)methane, with epichlorohydrin. These compounds may be used alone or in combination of two or more.

The oxazoline compound is preferably, for example, a bisoxazoline compound. Examples include 2,2'-bis(2-oxazoline), 2,2'-bis(4-methyl-2-oxazoline), 2,2'-bis(4,4-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-p-phenylenebis(4,4-dimethyl-2-oxazoline), 2,2'-m-phenylenebis(4-methyl-2-oxazoline), 2,2'-m-phenylenebis(4,4-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4-dimethyl-2-oxazoline), 2,2'-9,9'-diphenoxyethanebis(2-oxazoline), 2,2'-cyclohexylenebis(2-oxazoline), and 2,2'-diphenylenebis(2-oxazoline). Among them, 2,2'-bis(2-oxazoline) is most preferred in view of reactivity with the polyester. The bisoxazoline compounds listed above may be used alone or in combination of two or more as long as the objects of the invention can be achieved.

Among these hydrolysis-resistant agents, those with low volatility are preferred, and therefore, those with high-molecular-weights are preferred. A high-molecular-weight hydrolysis-resistant agent may be allowed to react with the polyester, so that the resulting modified polyester can have significantly reduced crystallinity, which makes it possible to obtain a pressure-sensitive adhesive layer with significantly improved formability and durability (storage stability against heating and humidification).

The amount of the hydrolysis-resistant agent (particularly, the carbodiimide group-containing compound) is preferably from 0.05 to 5 parts by weight, more preferably from 0.1 to 3 parts by weight, even more preferably from 0.2 to 1 part by weight, based on 100 parts by weight of the polyester. When the amount of the hydrolysis-resistant agent falls within these ranges, the durability (heating humidification storage stability) can be improved, which is preferred.

As long as the properties of the pressure-sensitive adhesive composition (pressure-sensitive adhesive layer) of the invention are not impaired, a common additive may be used, such as a silane coupling agent, a surface lubricant, a leveling agent, an antioxidant, a polymerization inhibitor, an ultraviolet absorber, a light stabilizer, a release modifier, a plasticizer, a softening agent, an inorganic or organic filler, a colorant such as a pigment or a dye, an age resistor, a surfactant, a metal powder, or a particulate or flaky material.

The pressure-sensitive adhesive layer may be formed using any conventionally known method. For example, the pressure-sensitive adhesive layer may be formed according to a known method for producing a pressure-sensitive adhesive tape (pressure-sensitive adhesive sheet), such as a method that includes applying the pressure-sensitive adhesive composition (a solution of the pressure-sensitive adhesive composition in a solvent or a hot melt thereof) to the support described below and drying the composition to form a pressure-sensitive adhesive layer; a method that includes applying the pressure-sensitive adhesive composition to the support, drying the composition to form a pressure-sensitive adhesive composition layer, and further crosslinking it to form a pressure-sensitive adhesive layer; a method that includes forming a pressure-sensitive adhesive layer on the release liner described below by coating and then moving (transferring) the pressure-sensitive adhesive layer onto the support; a method of applying a pressure-sensitive adhesive layer-forming material to the support by extrusion; a method of extruding a support and a pressure-sensitive adhesive layer in two or more layers; or a method of laminating a single pressure-sensitive adhesive layer onto the support. The pressure-sensitive adhesive layer may also be formed using a method of co-extruding a thermoplastic resin support and a pressure-sensitive adhesive layer in two or more layers by inflation method or T-die method.

As a method for applying the pressure-sensitive adhesive composition (solution), a conventionally and publicly-known method may be employed, and examples of the method include roll coating, gravure coating, reverse roll coating, roll brush coating, air knife coating, spray coating, and extrusion coating with a die coater or the like.

The thickness of the pressure-sensitive adhesive layer (after drying) may be selected as appropriate. For example, the pressure-sensitive adhesive layer (after drying) preferably has a thickness of about 1 to about 150 µm, more preferably about 3 to about 100 µm, even more preferably about 5 to about 60 µm. If the pressure-sensitive adhesive layer has a thickness of less than 1 µm, sufficient adhesive strength (adhesive force) can be difficult to obtain, and the pressure-sensitive adhesive layer may easily peel off. If the thickness is more than 150 µm, thickness accuracy may decrease and variations in thickness may easily occur during the coating process, which is not preferred. The pressure-sensitive adhesive layer may have a single-layer or laminated body.

The polyester-based pressure-sensitive adhesive layer of the invention, which is made from the polyester-based pressure-sensitive adhesive composition, preferably has an adhesive strength of 7 N/20 mm or more, more preferably 7.5 N/20 mm or more, even more preferably 8 N/20 mm or more, to a polycarbonate (PC) plate. The adhesive strength of less than 7 N/20 mm can be too low so that bonding to curved surfaces or the like can be difficult, which is not preferred.

The polyester-based pressure-sensitive adhesive layer of the invention preferably has a holding power of 0.8 mm/60 minutes or less, more preferably 0.5 mm/60 minutes or less, even more preferably 0.4 mm/60 minutes or less, at 40° C. A holding power of more than 0.8 mm/60 minutes can cause significant displacement of the polyester-based pressure-sensitive adhesive layer and can make it impossible to fix the polyester-based pressure-sensitive adhesive layer at a constant position for a long period of time, which is not preferred.

The polyester-based pressure-sensitive adhesive layer of the invention is preferably provided with a release liner on at least one side of it. A release liner or liners provided on one or both sides of the pressure-sensitive adhesive layer can protect and preserve the surface of the pressure-sensitive adhesive layer until the pressure-sensitive adhesive layer (the pressure-sensitive adhesive tape or the double-coated pressure-sensitive adhesive tape) is used, and are also useful for workability and other properties.

The release liner is not limited and may be a conventionally known appropriate release liner. For example, the release liner to be used may include a substrate (a substrate for a release liner) and a release coating layer that is formed on at least one side of the substrate by a coating treatment with a parting agent (release agent) for imparting releasability, such as a silicone release agent, a fluoride release agent, a long-chain alkyl release agent, or a fatty acid amide release agent. The substrate for the release liner may have a single-layer or multilayer structure.

It is possible to use, as the substrate for a release liner, various thin leaf-shaped materials such as a plastic film, a paper, a foam and a metal foil, and a plastic film is particularly preferred. Examples of the raw material of the plastic film include polyesters such as polyethylene terephthalate; polyolefins such as polypropylene and an ethylene-propylene copolymer; and thermoplastic resins such as polyvinyl chloride. A plastic film including poly-lactic acid, polyester, or polyamide obtained from a plant-derived raw material is also preferably used.

The thickness of the substrate for a release liner can be appropriately selected according to the purposes.

The polyester-based pressure-sensitive adhesive tape of the invention preferably also has a support provided on at least one side of the polyester-based pressure-sensitive adhesive layer. The polyester-based double-coated pressure-sensitive adhesive tape of the invention preferably includes at least two polyester-based pressure-sensitive adhesive layers and a support provided on at least one side of the polyester-based pressure-sensitive adhesive layer. In a preferred mode, the pressure-sensitive adhesive tape or the double-coated pressure-sensitive adhesive tape has a support on at least one side of the pressure-sensitive adhesive layer and thus has improved mechanical strength or improved workability due to the support. For the purpose of the invention, the term "pressure-sensitive adhesive tape" or "double-coated pressure-sensitive adhesive tape" is intended to include a pressure-sensitive adhesive film, a pressure-sensitive adhesive sheet, a support-less double-coated pressure-sensitive adhesive tape (a pressure-sensitive adhesive layer alone or a substrate-less tape), and a pressure-sensitive adhesive tape having a support or a double-coated pressure-sensitive adhesive tape having a support.

<Support>

The support is not particularly limited and conventionally and publicly-known supports can be used, that is, various kinds of supports (substrates) such as a plastic film, porous materials including paper and non-woven fabrics may be used. In the case of use for surface protection, it is a preferable embodiment to use a plastic film in terms of durability and the like. Examples of the plastic film may include polyolefin films of polyethylene, polypropylene, poly-1-butene, poly-4-methyl-1-pentene, ethylene-propylene copolymer, ethylene-1-butene copolymer, ethylene-vinyl acetate copolymer, ethylene-ethyl acrylate copolymer, ethylene-vinyl alcohol copolymer, and the like; polyester films of polyethylene terephthalate, polyethylene naphthalate, polybutylene terephthalate, and the like; polyacrylate films; polystyrene films; polyamide films of nylon6, nylon6,6, partially aromatic polyamide, and the like; polyvinyl chloride films; polyvinylidene chloride films; and polycarbonate films. A support made of polylactic acid or cellulose produced from plant-derived raw materials can be preferably used.

In the support, if necessary, various additives used in a conventional substrate for a pressure-sensitive adhesive tape (support), such as ultraviolet absorbers, photostabilizers, antioxidants, antistatic agents, fillers, pigments and dyes can be used.

If necessary, a surface of the support may be subjected to common surface treatment in order to increase anchoring to the pressure-sensitive adhesive layer, and for example, oxidation treatment by chemical or physical method such as chromate treatment, exposure to ozone, exposure to flames, exposure to high voltage electric shock, or ionization radiation treatment may be carried out, or coating treatment with an undercoating agent or the like may be carried out. Further, the surface of the support may also be subjected to an antifouling treatment with a silica powder or other materials or to an antistatic treatment of a coating, kneading, or vapor-deposition type.

When used to form the pressure-sensitive adhesive tape or the double-coated pressure-sensitive adhesive tape of the invention, the support may also have an intermediate layer, an undercoat layer, or the like with no problem as long as the properties of the support are not impaired.

The thickness of the support may be selected properly depending on its material or configuration, but the thickness is preferably, for example, 1000 µm or thinner, more preferably about 1 to 1000 µm, furthermore preferably about 2 to 500 µm, still more preferably about 3 to 300 µm, and particularly preferably about 5 to 250 µm.

<Applications>

The polyester-based pressure-sensitive adhesive tape of the invention and the polyester-based double-coated pressure-sensitive adhesive tape of the invention can be used for fixation of members or parts, bonding of labels, and other general-purpose applications such as packaging materials, building materials such as wall-papers, and decorative sheets.

EXAMPLES

Hereinafter, the invention will be more specifically described with reference to examples, which however are not intended to limit the invention. In the examples, "parts" refers to "parts by weight." Table 1 shows the formulation of pressure-sensitive adhesive compositions and the results of evaluation of pressure-sensitive adhesive tapes.

<Preparation of Polyester>

A three-necked separable flask equipped with a stirrer, a thermometer, and a vacuum pump was charged with 97.8 g of a dimer acid (Pripol 1009 (trade name) manufactured by Croda, 567 in molecular weight), 102.2 g of a dimer diol (Pripol 2033 (trade name) manufactured by Croda, 537 in molecular weight), and 0.2 g of dibutyltin oxide (manufactured by KANTO CHEMICAL CO., INC.) as a catalyst. The mixture was heated to 200° C. with stirring under a reduced-pressure atmosphere (2.0 kPa or less), and then this temperature was maintained. The reaction was continued for about 5 hours to produce a polyester, which had a weight average molecular weight (Mw) of 28,000.

Example 1

To 100 parts of the polyester were added 3.75 parts of hexamethylene diisocyanate (TPA-100 (trade name) manufactured by Asahi Kasei Chemicals Corporation) as a cross-linking agent, 40 parts of a terpene phenol (YS POLYSTER 5145 (trade name) manufactured by YASUHARA CHEMICAL CO., LTD.) as a tackifier, and 0.5 parts of a carbodi-imide group-containing compound (CARBODILITE V-03 (trade name) manufactured by Nisshinbo Chemical Inc.) as a hydrolysis-resistant agent. Toluene was added to the resulting mixture until a solid content of 60% was reached, so that a pressure-sensitive adhesive composition (a pressure-sensitive adhesive solution) was obtained. The pressure-sensitive adhesive composition was applied to the release-treated surface of a release-treated polyethylene terephthalate (PET) film (Diafoil MRF #38 (trade name) manufactured by Mitsubishi Plastics, Inc.) so that a 30-µm- thick coating could be formed after drying. The coating was then dried at 120° C. for 3 minutes to form a pressure-sensitive adhesive layer. Subsequently, the pressure-sensitive adhesive layer was attached to the release-treated surface of a release-treated polyethylene terephthalate (PET) film (Diafoil MRE #38 (trade name) manufactured by Mitsubishi Plastics, Inc.). The resulting laminate was then allowed to stand at 40° C. for 3 days to give a pressure-sensitive adhesive tape.

Example 2

A pressure-sensitive adhesive tape was obtained as in Example 1, except that the amount of the crosslinking agent was changed to 3.5 parts, the amount of the tackifier was changed to 20 parts, and a carbodiimide group-containing compound (CARBODILITE V-07 (trade name)) was used instead as the hydrolysis-resistant agent.

Example 3

A pressure-sensitive adhesive composition was prepared as in Example 1, except that the amount of the crosslinking agent was changed to 4 parts and a carbodiimide group-containing compound (CARBODILITE V-07 (trade name) manufactured by Nisshinbo Chemical Inc.) was used instead as the hydrolysis-resistant agent. The pressure-sensitive adhesive composition was applied to the release-treated surface of a release-treated polyethylene terephthalate (PET) film (Diafoil MRF #38 (trade name) manufactured by Mitsubishi Plastics, Inc.) so that a 19-μm-thick coating could be formed after drying. The coating was then dried at 120° C. for 3 minutes to form a pressure-sensitive adhesive layer. The pressure-sensitive adhesive composition was also applied to another release-treated PET film (Diafoil MRE #38 (trade name) manufactured by Mitsubishi Plastics, Inc.), so that two pressure-sensitive adhesive layers were obtained. A 12-μm-thick PET film (Lumirror 12S10 (trade name) manufactured by PANAC Co., Ltd.) was sandwiched between the two pressure-sensitive adhesive layers to form a PET-backed pressure-sensitive adhesive tape (PET-backed double-coated tape).

Example 4

A pressure-sensitive adhesive tape was obtained as in Example 2, except that the amount of the crosslinking agent was changed to 2.75 parts and 40 parts of a terpene resin (YS RESIN PX1250 (trade name) manufactured by YASUHARA CHEMICAL CO., LTD.) was used instead as the tackifier.

Example 5

A pressure-sensitive adhesive tape was obtained as in Example 4, except that 20 parts of a terpene phenol (YS POLYSTER 1145 (trade name) manufactured by YASUHARA CHEMICAL CO., LTD.) and 20 parts of a terpene resin (YS RESIN PX1250 (trade name) manufactured by YASUHARA CHEMICAL CO., LTD.) were used instead as tackifiers and 1 part of a carbodiimide group-containing compound (CARBODILITE V-03 (trade name) manufactured by Nisshinbo Chemical Inc.) was used instead as the hydrolysis-resistant agent.

Example 6

A pressure-sensitive adhesive tape was obtained as in Example 1, except that the amount of the crosslinking agent was changed to 3.5 parts and 30 parts of a terpene phenol (YS POLYSTER S145 (trade name) manufactured by YASUHARA CHEMICAL CO., LTD.) and 10 parts of a hydrogenated terpene resin (CLEARON P125 (trade name) manufactured by YASUHARA CHEMICAL CO., LTD.) were used instead as tackifiers.

Example 7

A pressure-sensitive adhesive tape was obtained as in Example 2, except that the amount of the crosslinking agent was changed to 3 parts and 40 parts of an aromatic modified terpene resin (YS RESIN 10115 (trade name) manufactured by YASUHARA CHEMICAL CO., LTD.) was used instead as the tackifier.

Example 8

A pressure-sensitive adhesive tape was obtained as in Example 2, except that the amount of the crosslinking agent was changed to 4 parts, 30 parts of a terpene phenol (YS POLYSTER S145 (trade name) manufactured by YASUHARA CHEMICAL CO., LTD.) and 10 parts of rosin ester (PENSEL D135 (trade name) manufactured by ARAKAWA CHEMICAL INDUSTRIES, LTD.) were used instead as tackifiers, and the amount of the hydrolysis-resistant agent was changed to 0.1 parts.

Example 9

A pressure-sensitive adhesive tape was obtained as in Example 8, except that 20 parts of a terpene phenol (YS POLYSTER S145 (trade name) manufactured by YASUHARA CHEMICAL CO., LTD.) and 20 parts of rosin ester (PENSEL D135 (trade name) manufactured by ARAKAWA CHEMICAL INDUSTRIES, LTD.) were used instead as tackifiers and the amount of the hydrolysis-resistant agent was changed to 0.5 parts.

Example 10

A pressure-sensitive adhesive tape was obtained as in Example 2, except that 10 parts of a terpene phenol (YS POLYSTER S145 (trade name) manufactured by YASUHARA CHEMICAL CO., LTD.) and 30 parts of rosin ester (PENSEL D135 (trade name) manufactured by ARAKAWA CHEMICAL INDUSTRIES, LTD.) were used instead as tackifiers and the amount of the hydrolysis-resistant agent was changed to 2 parts.

Comparative Example 1

A pressure-sensitive adhesive tape was obtained as in Example 1, except that the amount of the crosslinking agent was changed to 3.5 parts and rosin ester (PENSEL D135 (trade name) manufactured by ARAKAWA CHEMICAL INDUSTRIES, LTD.) was used instead as the tackifier.

Comparative Example 2

A pressure-sensitive adhesive tape was obtained as in Comparative Example 1, except that 0.1 parts of a carbodiimide group-containing compound (CARBODILITE V-07 (trade name) manufactured by Nisshinbo Chemical Inc.) was used instead as the hydrolysis-resistant agent.

Comparative Example 3

A pressure-sensitive adhesive tape was obtained as in Comparative Example 2, except that the amount of the hydrolysis-resistant agent was changed to 1 part.

Comparative Example 4

A pressure-sensitive adhesive tape was obtained as in Example 3, except that rosin ester (PENSEL D135 (trade name) manufactured by ARAKAWA CHEMICAL INDUSTRIES, LTD.) was used instead as the tackifier and no hydrolysis-resistant agent was added.

Comparative Example 5

A pressure-sensitive adhesive tape was obtained as in Example 5, except that no hydrolysis-resistant agent was added.

<Weight Average Molecular Weight of Polyester>

The weight average molecular weight (Mw) of the polymer (polyester) was determined by a gel permeation chromatography (GPC) method using a solution of the polymer in tetrahydrofuran (THF) and a calibration curve prepared with polystyrene standards.

(Measurement Conditions)

Apparatus name: HLC-8220GPC, manufactured by Tosoh Corporation

Test piece concentration: 0.1% by weight (THF solution)

Test piece injection amount: 20 μl

Eluent: THF

Flow rate: 0.300 ml/min

Measurement (column) temperature: 40° C.

Column: Test piece column; TSKguardcolumn SuperHZ-L (1 column)+TSKgel SuperHZM-M (2 columns), reference column; TSKgel SuperH-RC (1 column), manufactured by Tosoh Corporation Detector: Differential refractometer (RI)

<Measurement of Softening Point of Tackifier>

The softening point of the tackifier was measured according to the ring and ball method described in JIS K 5601.

<Measurement of Acid Value of Tackifier>

The acid value of the tackifier was measured according to the method described in JIS K 0070.

<Adhesive Strength to Polycarbonate (PC) Plate>

One of the release-treated films was peeled off from the resulting pressure-sensitive adhesive tape. The exposed pressure-sensitive adhesive surface was then bonded to a 25-μm-thick polyethylene terephthalate (PET) film (Lumirror 25S10 (trade name) manufactured by PANAC Co., Ltd.) to form a sample. A 20-mm-wide piece was cut from the sample, and the other release-treated film was then peeled off. The exposed pressure-sensitive adhesive surface was then bonded to a polycarbonate plate (PC1600 (trade name) manufactured by Takiron Co., Ltd.) to form a test piece, which was measured for adhesive strength (N/20 mm) to the PC plate.

In the bonding process, pressure bonding was performed by reciprocating a 2 kg roller once. Thirty minutes after the bonding, the sample piece was subjected to 180° peel adhesive strength (adhesive force) measurement with a tensile compression tester (TG-1 kN (device name) manufactured by Minebea Co., Ltd.) under the following conditions.

Tension (peel) rate: 300 mm/minute

Measurement conditions: temperature 23±2° C.; humidity 65±5% RH

The adhesive strength (adhesive force) to the PC plate is preferably 7 N/20 mm or more, more preferably 7.5 N/20 mm or more, even more preferably 8 N/20 mm or more. An adhesive strength of less than 7 N/20 mm can be too low so that bonding to curved surfaces or the like can be difficult, which is not preferred.

(Holding Power)

One of the release-treated films was peeled off from the resulting pressure-sensitive adhesive tape. The exposed pressure-sensitive adhesive surface was then bonded to a 25-μm-thick polyethylene terephthalate (PET) film (Lumirror 25S10 (trade name) manufactured by PANAC Co., Ltd.) to form a sample. A 10-mm-wide, 100-mm-long piece was cut from the sample, and the other release-treated film was then peeled off. The exposed pressure-sensitive adhesive surface was then bonded to a 25-mm-wide, 125-mm-long, 2-mm-thick Bakelite plate to form a measurement piece. In the bonding process, the widthwise and longitudinal directions of the sample piece were aligned with those of the Bakelite plate, respectively, and the sample piece was pressure-bonded to a widthwise central part of the Bakelite plate by reciprocating a 2 kg roller once in such a way that they were lapped at a 10-mm-wide, 20-mm-long area. After the measurement piece was allowed to stand in a 40° C. atmosphere for 30 minutes, the sample piece was allowed to stand in a 40° C. atmosphere for 1 hour (60 minutes) while being loaded with 0.5 kg. Thereafter, the length (mm/60 minutes) of displacement of the sample piece was measured as an index of the holding power.

The holding power at 40° C. is preferably 0.8 mm/60 minutes or less, more preferably 0.5 mm/60 minutes or less, even more preferably 0.4 mm/60 minutes or less. If the holding power is more than 0.8 mm/60 minutes, the pressure-sensitive adhesive tape may slide significantly and fail to provide stable fixation for a long period of time, which is not preferred.

<Durability (Heating Humidification Storage Stability)>

One of the release-treated films was peeled off from the resulting pressure-sensitive adhesive tape. The exposed pressure-sensitive adhesive surface was then bonded to a 25-μm-thick polyethylene terephthalate (PET) film (Lumirror 25S10 (trade name) manufactured by PANAC Co., Ltd.) to form a sample. A 20-mm-wide piece was cut from the sample, and the other release-treated film was then peeled off. The exposed pressure-sensitive adhesive surface was then bonded to a SUS 304 plate to form a test piece. The test piece was allowed to stand under the conditions of 85° C. and 85% RH for 500 hours, after which it was observed whether peeling, lifting, oozing, or displacement occurred.

○ (good): No peeling, lifting, oozing, or displacement occurs.

x (poor): Peeling, lifting, oozing, or displacement occurs.

TABLE 1

| | Formulation of pressure-sensitive adhesive composition | | | | Pressure-sensitive adhesive layer Gel fraction | Results of evaluation of pressure-sensitive adhesive tape | | |
|---|---|---|---|---|---|---|---|---|
| | Tackifier | | Anti-hydrolysis agent | | | Adhesive strength to PC plate | Holding power at 40° C. | Heating humidification storage stability at 85° C. and 85% |
| | Type | Acid value | Type | Parts | Wt % | N/20 mm | mm/60 minutes | for 500 hours |
| Example 1 | Terpene phenol | less than 1 | V-03 | 0.5 | 41.1 | 8.9 | 0.2 | ○ |
| Example 2 | Terpene phenol | less than 1 | V-07 | 0.5 | 54.1 | 7.6 | 0.1 | ○ |
| Example 3 | Terpene phenol | less than 1 | V-07 | 0.5 | 43.5 | 10.4 | 0.1 | ○ |
| Example 4 | Terpene | less than 1 | V-07 | 0.5 | 48.0 | 8.0 | 0.1 | ○ |
| Example 5 | Terpene phenol/terpene | less than 1 | V-03 | 1 | 40.5 | 9.6 | 0.2 | ○ |
| Example 6 | Terpene phenolic/hydrogenated terpene | less than 1 | V-03 | 0.5 | 45.7 | 7.9 | 0.1 | ○ |
| Example 7 | Aromatic modified terpene | less than 1 | V-07 | 0.5 | 52.7 | 7.3 | 0.1 | ○ |
| Example 8 | Terpene phenol/rosin ester | 3 | V-07 | 0.1 | 36.7 | 9.0 | 0.2 | ○ |
| Example 9 | Terpene phenol/rosin ester | 6 | V-07 | 0.5 | 45.2 | 8.5 | 0.1 | ○ |
| Example 10 | Terpene phenol/rosin ester | 8 | V-07 | 2.0 | 40.3 | 9.1 | 0.1 | ○ |
| Comparative Example 1 | Rosin ester | 11 | V-03 | 0.5 | 53.6 | 7.3 | 0.1 | x |
| Comparative Example 2 | Rosin ester | 11 | V-07 | 0.1 | 37.6 | 8.3 | 0.2 | x |
| Comparative Example 3 | Rosin ester | 11 | V-07 | 1 | 44.0 | 9.0 | 0.1 | x |
| Comparative Example 4 | Rosin ester | 11 | — | — | 34.6 | 9.2 | 0.2 | x |
| Comparative Example 5 | Terpene phenol/terpene | less than 1 | — | — | 39.5 | 10.9 | 0.3 | x |

The evaluation results in Table 1 show that pressure-sensitive adhesive layers (pressure-sensitive adhesive tapes) with desired adhesive properties (adhesive strength and cohesive strength) and desired durability (heating humidification storage stability) are obtained in Examples 1 to 10 each using a polyester-based pressure-sensitive adhesive composition containing a tackifier with a specific acid value and a hydrolysis-resistant agent.

In contract, it is demonstrated that poor durability (heating humidification storage stability) is obtained and high durability (high heating humidification storage stability) and good adhesive properties are not simultaneously provided in Comparative Examples 1 to 3 not using a tackifier with a specific acid value, in Comparative Example 5 not using any hydrolysis-resistant agent, or in Comparative Example 4 not using any tackifier with a specific acid value or any hydrolysis-resistant agent.

DESCRIPTION OF REFERENCE SIGNS

In the drawings, reference sign 1 represents a release liner, 2 a pressure-sensitive adhesive layer, 3 a support, 10 a double-coated pressure-sensitive adhesive tape (with no support), 10' a double-coated pressure-sensitive adhesive tape (with a support), and 10" a pressure-sensitive adhesive tape (with a support).

The invention claimed is:

1. A polyester-based pressure-sensitive adhesive layer comprising a polyester-based pressure-sensitive adhesive composition comprising a polyester, a hydrolysis-resistant agent, a tackifier, and a crosslinking agent, wherein
the tackifier has an acid value of 8 or less,
the tackifier has a softening point of 80 to 170° C.,
the polyester-based pressure-sensitive adhesive composition containing 20 to 40 parts by weight of the tackifier based on 100 parts by weight of the polyester,
the polyester has a weight average molecular weight of 15,000 to 60,000,
the polyester-based pressure-sensitive adhesive layer has a holding power of 0.8 mm/60 minutes or less at 40° C., and
the polyester-based pressure-sensitive adhesive composition contains 0.05 to 2 parts by weight of the hydrolysis-resistant agent based on 100 parts of the polyester.

2. The polyester-based pressure-sensitive adhesive layer according to claim 1, wherein the hydrolysis-resistant agent is a carbodiimide group-containing compound.

3. The polyester-based pressure-sensitive adhesive layer according to claim 1, wherein the polyester is a product obtained by polycondensation of at least a dicarboxylic acid component and a diol component.

4. The polyester-based pressure-sensitive adhesive layer according to claim 1, wherein the tackifier comprises at least one terpene resin.

5. The polyester-based pressure-sensitive adhesive layer according to claim 1, wherein
the polyester-based pressure-sensitive adhesive layer has an adhesive strength of 7 N/20 mm or more to a polycarbonate plate.

6. The polyester-based pressure-sensitive adhesive layer according to claim 5, which is provided with a release liner on at least one side of the layer.

7. The polyester-based pressure-sensitive adhesive layer according to claim 1, wherein all of the polyester in said polyester-based pressure-sensitive adhesive composition possesses a weight average molecular weight of 15,000 to 60,000.

8. A polyester-based pressure-sensitive adhesive tape comprising the polyester-based pressure-sensitive adhesive layer according to claim 5 and a support provided on at least one side of the layer.

9. A polyester-based double-coated pressure-sensitive adhesive tape, comprising:
   at least two polyester-based pressure-sensitive adhesive layers according to claim 5; and
   a support provided between the two polyester-based pressure-sensitive adhesive layers.

* * * * *

UNITED STATES PATENT AND TRADEMARK OFFICE
CERTIFICATE OF CORRECTION

PATENT NO. : 10,087,345 B2  
APPLICATION NO. : 15/103574  
DATED : October 2, 2018  
INVENTOR(S) : Akiko Yoshida Page 1 of 1

It is certified that error appears in the above-identified patent and that said Letters Patent is hereby corrected as shown below:

In the Specification

In Column 15, Line 6 (Approx.), change "MRE" to --MRF--.

In Column 15, Line 33 (Approx.), change "MRE" to --MRF--.

Signed and Sealed this
Twenty-first Day of April, 2020

Andrei Iancu
*Director of the United States Patent and Trademark Office*